April 30, 1968  W. DE FRANK  3,380,307
LID SCOOP
Filed Feb. 7, 1966

INVENTOR
WILLIAM DE FRANK 3,380,307
LID SCOOP
William De Frank, Rochester, N.Y., assignor to C. H. Stuart & Co., Inc., Newark, N.Y., a corporation of New York
Filed Feb. 7, 1966, Ser. No. 525,534
8 Claims. (Cl. 73—427)

ABSTRACT OF THE DISCLOSURE

A lid 2 including a flexible body portion 2a adapted for closure of an opening of a container 1. The lid 2 is easily deformable into the shape of a handle adapted to be received in the opening of the container 1. The lid includes a large scoop portion 3, extending on only a portion about the lid, integral with the body portion 2a. A flexible peripheral side flange 4 extending around the entire periphery of the lid 2 is adapted for securing the lid 2 to the container 1 and is integral with the scoop 3.

This invention relates generally to scoop and measuring devices more particularly to measuring devices for canned and packaged goods.

Summary of invention

This invention provides a closure lid for a container which is made of a flexible material suitable for deformation into the shape of a handle. There is included on the lid a scoop portion extending only a portion about the periphery of the lid, and adapted to be received internally of the container when the lid is flexed to define a handle.

The canned and packaged goods of today do not contain a scoop lid for removing contents, such as; my resilient lipped or flanged scoop lid, which comes with the canned goods and the function of which, when deformed, is to scoop out and measure the amount of coffee, et cetera, as needed thus eliminating the need for a conventional scoop or measuring device which is used at the present time and is very impractical to use because part of the contents of the canned goods need to be consumed before a conventional scoop can be placed within the can or package. My invention presents a novel solution to this problem, and generally provides a novel lid scoop and measuring device which is always on hand with the canned goods.

It is one object of my invention to provide improved marketing of canned and packaged goods, containing resilient lids.

It is a specific object of my invention to provide additional use for the resilient lid by deforming same into a scoop and measuring device.

Other objects and advantages of this invention will be particularly set forth in the claims and will be apparent from the following description, when taken in connection with the accompanying drawings, in which:

Figure 3:
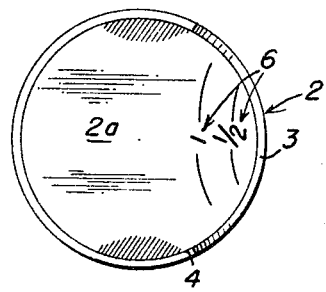
FIG. 3 is a bottom view of resilient scoop lid showing measurements and side grip flanges.
Figure 4:
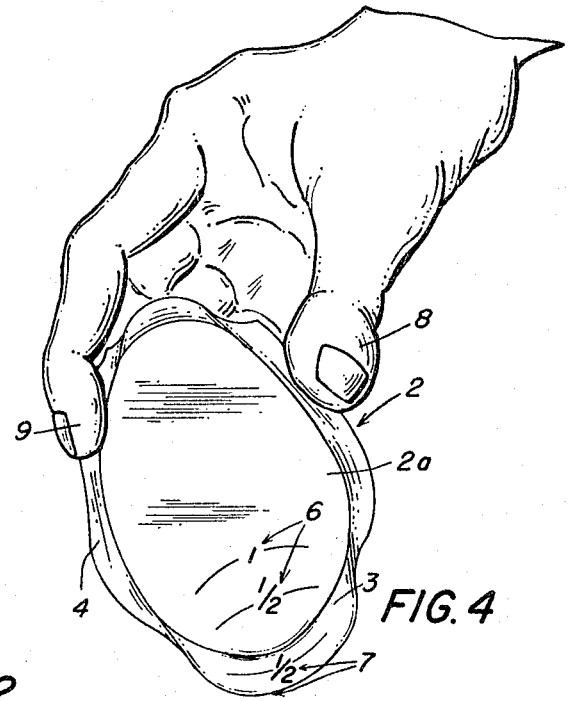

FIG. 4 the concept of using resilient lid when deformed into a handle for a scoop to be inserted into the container.

Figure 5:
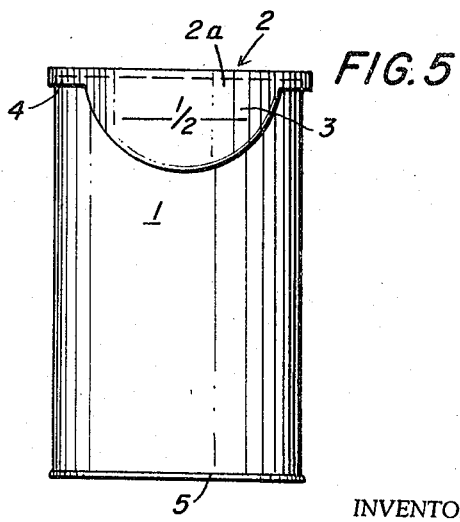

FIG. 5 is a front view of resilient scoop lid in use as container cover.

Figure 2:
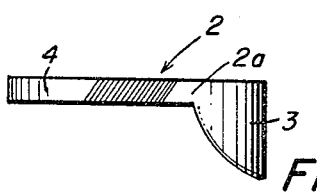
FIG. 2 is a side view of my resilient scoop lid showing shape and firm grip side flanges.
Figure 1:
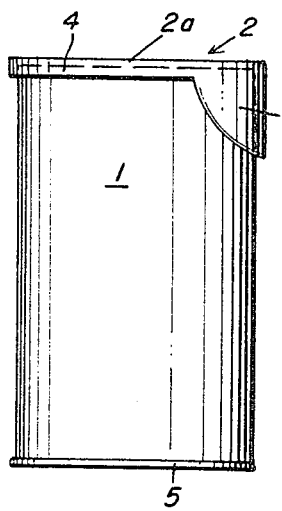
FIG. 1 is a side view of a sealed container with my resilient scoop lid in place.

In FIGS. 1 and 2, I have illustrated a suitable container 1, as for example a coffee can, with my resilient lid generally indicated by the numeral 2. Such reclosure lids for coffee cans and the like are in wide commercial use and well-known in the art.

As is well-known in the art, the lid 2 is made of resilient material, preferably polyethylene, and is of a circular configuration as viewed from the top or bottom and is adapted to overlie a cylindrical container 2 of circular cross-section.

As is well-known in the reclosure lids of this nature, the resilient lid 2, is formed with a flexible top or body portion and circular construction 2a and having an integral flexible peripheral lid or side flange 4 for gripping the upper bead of the can or container 1. The side flange 4 extends circumferentially around the outer edge of the circular body portion 2a; preferably, the flange 4 has an endless groove (not shown) for firmly gripping the upper can bead (not shown but similar to bottom bead 5) formed at the top of the container. In this manner, the lid is securely held onto the container, all of which is well-known in the art.

My lid has a downwardly depending enlarged or scoop portion 3 being integral with both the body portion 2a and side flange 4 forming an extension of the flexible lid 2.

The depending scoop portion 3 extends at approximately 90° to the upper surface of the lid 2 and is adapted to overlie a portion of the side wall of the container as illustrated in FIGS. 1 and 5.

In FIG. 4, I have shown the principal concept of my invention by illustrating the lid 2 being deformed into a handle configuration so that the scoop is adapted to be inserted into the container 1, for scooping, measuring and removing whatever granular or other contents there might be therein as for instance, coffee. On the internal surface of body portion 2a of lid 2 are printed indicia indicated by the double arrow 6, which indicia obviously stands for 1 tablespoon and ½ tablespoon respectively. Coactive with the internal printed indicia on the body portion 2a is indicia on the flexible scoop portion 3, indicated by the double arrow 7 comprising the lower edge or rim of the flexible scoop 3 which coactive with the line designated by the 1 on body portion 2a is indicative of approximately one tablespoon volumetric measure therebetween when the lid 2 is deformed into the handle shape shown in FIG. 4. The ½ and line indicia on the scoop portion 3 and on the body portion 2a coactively define therebetween approximately a one-half tablespoon volumetric measure when the body portion 2a is thus deformed. It will be understood that upon flexure and deformation to the FIG. 4 position, the body portion 2a, will be curved to define a volume of volumetric area with the scoop portion 3 which is flexed outwardly by pressure applied by the thumb 8 and forefinger 9, compressing the side flanges 4 inwardly. I am thus able to perform a method of removing contents from a container comprising the steps of deforming a flexible closure lid 2 adapted for closure of the container 1 into a shape defining a handle adapted to be received within the opening of the container 1, thereafter inserting the deformed lid into the container 1 through the openings thereof, scooping a selected volumetric quantity of the contents of the container into the deformed lid and thereafter removing the deformed lid and contents.

While I have described the preferred form of my invention it will be apparent that various modifications and changes may be made therein, without departing from the spirit of my invention as set forth in the appended claims.

I claim:

1. A lid comprising a flexible body portion adapted for closure of an opening of a container and deformable into a handle adapted to be received in said opening, said lid having a flexible peripheral side flange integral with said body portion and adapted for securing said lid in closure relationship with said container, an enlarged scoop portion extending only a portion along said lid and being integral with said body portion, said scoop portion being coactive with said body portion to form a volumetric scoop when the body portion is deformed to define a handle, said scoop portion also being coactive with said flange to form an angle of less than 180° with the body portion when the body portion is deformed to define a handle.

2. A lid in accordance with claim 1 in which said body portion is circular and said flange is adapted for exteriorly embracing said container.

3. A lid in accordance with claim 1 in which said scoop extends exteriorly of said container when said side flange is received on said container in a manner securing said lid thereto.

4. In combination, a container having an opening, and a lid comprising a flexible body portion adapted for closure of said opening and being deformable into a handle adapted to be received in said opening, securing means extending around the periphery of said lid for securing said lid in closure relationship with said container, an enlarged scoop portion extending only a portion along said lid integral with said body portion, said scoop portion being coactive with said body portion to form a volumetric scoop when the body portion is deformed to define a handle adapted to be received within said opening, said scoop portion also being coactive with said securing means to form an angle of less than 180° with the body portion when the body portion is deformed to define a handle.

5. A lid comprising a flexible body portion adapted for closure of an opening of a container and deformable into a handle, a scoop portion extending only a portion along the periphery of said lid integral with said body portion, said scoop portion being coactive with said body portion to form a volumetric scoop when the body portion is deformed to define a handle, volumetric measuring indicia on said body portion defining a selected volume extending between said scoop and body portions when the body portion is deformed to define a handle.

6. A lid comprising a flexible body portion adapted for closure of an opening of a container and deformable into a handle adapted to be received in said opening, said lid having a flexible peripheral side flange integral with said body portion and adapted for securing said lid in closure relationship with said container, an enlarged scoop portion extending only a portion along said lid and being an integral depending extension of said peripheral side flange, said scoop portion being responsive to flexure of said body portion and side flange to form a volumetric area with said body portion when the body portion is deformed to define a handle.

7. A lid comprising a flexible body portion adapted for closure of an opening of a container and deformable into a handle adapted to be received in said opening, said lid having a flexible peripheral side flange integral with said body portion and adapted for securing said lid in closure relationship with said container, an enlarged scoop portion extending only a portion along said lid and being integral with said body portion, said scoop portion being coactive with said body portion to form a volumetric scoop when the body portion is deformed to define a handle and including volumetric measuring indicia on said body portion defining a selected volume extending between said scoop and body portions when the body portion is deformed into a handle.

8. In combination, a container having an opening, and a lid comprising a flexible body portion adapted for closure of said opening and being deformable into a handle adapted to be received in said opening, securing means extending around the periphery of said lid for securing said lid in closure relationship with said container, an enlarged scoop portion extending only a portion along said lid and being an integral extension of said lid securing means, said scoop portion being coactive with said body portion to form a volumetric scoop when the body portion is deformed to define a handle adapted to be received within said opening.

References Cited

UNITED STATES PATENTS

| | | | |
|---|---|---|---|
| 1,552,999 | 9/1925 | Miner | 220—42 |
| 1,808,949 | 6/1931 | Flynn | 229—1.5 |
| 1,850,494 | 3/1932 | Brewer | 229—1.5 |
| 2,598,987 | 6/1952 | Franzen | 229—1.5 |
| 2,630,237 | 3/1953 | Rosenlof | 220—50 X |
| 3,137,409 | 6/1964 | Davis | 220—60 X |
| 3,259,153 | 7/1966 | Haase | 141—110 |
| 3,259,279 | 7/1966 | Nojiri | 220—42 |

LOUIS R. PRINCE, *Primary Examiner.*

DANIEL M. YASICH, *Assistant Examiner.*